United States Patent
Gargano (10) Patent No.: US 12,466,565 B2
(45) Date of Patent: Nov. 11, 2025

(54) PARACHUTE WITH CANOPY SLITS OR OPENINGS FOR PREVENTING CANOPY INVERSION

(71) Applicant: AIRBORNE SYSTEMS NA INC., Pennsauken, NJ (US)

(72) Inventor: William Louis Bruce Gargano, Orange, CA (US)

(73) Assignee: Airborne Systems NA Inc, Pennsauken, NJ (US)

( * ) Notice: Subject to any disclaimer, the term of this patent is extended or adjusted under 35 U.S.C. 154(b) by 0 days.

(21) Appl. No.: 18/738,270

(22) Filed: Jun. 10, 2024

(65) Prior Publication Data

US 2025/0042557 A1 Feb. 6, 2025

Related U.S. Application Data (63) Continuation of application No. 17/992,342, filed on Nov. 22, 2022, now Pat. No. 12,030,649.

(60) Provisional application No. 63/283,358, filed on Nov. 26, 2021.

(51) Int. Cl.
*B64D 17/14* (2006.01)
*B64D 17/26* (2006.01)

(52) U.S. Cl.
CPC .............. *B64D 17/14* (2013.01); *B64D 17/26* (2013.01)

(58) Field of Classification Search
CPC ................................. B64D 17/14; B64D 17/26
See application file for complete search history.

(56) References Cited

U.S. PATENT DOCUMENTS

| 1,937,191 A | 11/1933 | Driggs, Jr. |
| 1,937,219 A | 11/1933 | Driggs, Jr. |
| 1,951,864 A | 3/1934 | Driggs, Jr. |
| 2,483,423 A | 10/1949 | Maggi |
| 2,737,358 A * | 3/1956 | Heinrich ............... B64D 17/18 244/145 |
| 2,746,699 A | 5/1956 | Hart |

(Continued)

FOREIGN PATENT DOCUMENTS

| CH | 162029 A | 5/1933 |
| DE | 3510990 A1 | 10/1986 |
| WO | 9105703 | 5/1991 |

OTHER PUBLICATIONS

Poynter, Dan, The Parachute Manual, A Technical Treatise on Aerodynamic Decelerators, 1991, pp. 314-315.

*Primary Examiner* — Justin M Benedik
(74) *Attorney, Agent, or Firm* — Dunlap, Bennett, & Ludwig PLLC (57) ABSTRACT

Parachutes which have a generally circular skirt or hem, such as semi-hemispherical, extended gore, or any variant of axisymmetric parachutes and cruciform parachutes with arms attached are disclosed with a plurality of vertical slits located in a circumferential band adjacent the skirt or hem of the parachute to prevent canopy inversion. During deployment, when the outer portion of the canopy is exposed to air flow, the slits open up and the drag of the skirt of the canopy is reduced, thus limiting the potential for hem migration. The slits are positioned to allow airflow therethrough in order for the pressure on the outside of the canopy to be transferred through the slit openings and released or transferred to inside of the lower section of the canopy. Instead of slits, elongated narrow openings can be utilized.

27 Claims, 9 Drawing Sheets

(56) References Cited

U.S. PATENT DOCUMENTS

| | | | |
|---|---|---|---|
| 2,797,885 A * | 7/1957 | Barish | B64D 17/14 |
| | | | 244/145 |
| 2,925,971 A | 2/1960 | Istel et al. | |
| 2,949,266 A | 8/1960 | Sepp, Jr. | |
| 3,152,782 A * | 10/1964 | Karpf | B64D 17/00 |
| | | | 244/152 |
| 4,065,079 A | 12/1977 | Winchurch | |
| 4,586,685 A * | 5/1986 | Kostelezky | B64D 17/14 |
| | | | 244/145 |
| 4,588,149 A * | 5/1986 | Gold | B64D 17/18 |
| | | | 244/145 |
| 4,927,099 A | 5/1990 | Emerson et al. | |
| 4,955,564 A | 9/1990 | Reuter | |
| 5,094,408 A * | 3/1992 | Doherr | B64D 17/14 |
| | | | 244/152 |
| 5,205,517 A | 4/1993 | Reuter | |
| 5,890,678 A | 4/1999 | Butler, Jr. | |
| 6,443,396 B1 * | 9/2002 | Berland | B64D 17/02 |
| | | | 244/145 |

\* cited by examiner

PARACHUTE WITH CANOPY SLITS OR OPENINGS FOR PREVENTING CANOPY INVERSION

CROSS REFERENCE TO RELATED APPLICATIONS

This application claims priority back to U.S. Provisional Patent Application No. 63/283,358, filed Nov. 26, 2021.

BACKGROUND OF THE INVENTION

1. Field of the Invention

The present invention relates in general to parachutes and more specifically to parachute deployment control systems which are capable of preventing canopy inversion.

2. Description of the Related Prior Art

There is a continuous ongoing effort to introduce parachute systems that will increase reliability and reduce or eliminate malfunctions of the parachute during deployment and flight. One common cause of parachute malfunction is partial or complete canopy inversion during deployment that usually result in burns and/or catastrophic failures in the parachute. More specifically, when the canopy hem is exposed to airflow during the deployment sequence, one section of the outer portion of the canopy can be pushed inward and migrate between the suspension lines toward the hem on the opposite side of the canopy. If enough area of the canopy migrates under the hem, the aerodynamic forces applied to this section of the canopy can be sufficient to create partial or total inversion of the canopy.

One common approach to attempting to reduce the occurrence of canopy inversions on personnel parachutes is to install a netting secured to the hem of the canopy. The anti-inversion netting generally consists of a strip of large netting attached to the hem of the canopy. Currently, on personnel parachutes, the netting dimension is usually 18.5 inches with five squares with sides of 3.6 inches each. The anti-inversion netting provides a physical barrier that prevents so-called "skirt-cross-unders". The netting solution, however, does not address the root cause of the inversion, but the netting acts as a physical barrier that prevents the hem from migrating through the suspension lines. For a discussion of partial and complete inversions, see *The Parachute Manual, a Technical Treatise on Aerodynamics Decelerators*, by Dan Poynter, Fourth Edition, 1991. A copy of the Poynter article was submitted as part of the aforesaid provisional application for patent, Application No. 63/283,358, filed Nov. 26, 2021; the disclosure of the Poynter article is expressly incorporated by reference as if fully set forth herein.

Other solutions introduced to mitigate inversions, primarily on large parachutes, are described in U.S. Pat. Nos. 5,890,678, 5,205,517, 4,955,564, 4,927,099, 4,588,149 and 4,065,079.

All of the foregoing solutions, however, require either significant manufacturing difficulties or additional features that make packing and maintenance of the parachute cumbersome and time consuming. Accordingly, a need exists for a simple solution which serves to overcome the problem of parachute canopy inversion.

SUMMARY OF THE INVENTION

In order to overcome the problem of parachute canopy inversion as described above, a simple and elegant solution has been surprisingly discovered. More specifically according to the present invention, a plurality of vertical slits located between selected radials, and preferably originating at the skirt or hem of the parachute, can serve to prevent canopy inversion. The present invention is especially useful for parachutes which have a generally circular skirt or hem, such as semi-hemispherical, extended gore, or any variant of axisymmetric parachutes and cruciform parachutes with arms attached, such as disclosed in U.S. Pat. No. 6,443,396, the disclosure of which is expressly incorporated by reference as if fully set forth herein. Although not preferred, elongated narrow openings can be incorporated instead of the preferred slits.

The vertical height or length of the slits (or narrow openings) can vary based upon the shape of the canopy, but generally the length of the slits is preferably between about five percent (5%) and about fifteen percent (15%) of the gore length depending upon the shape of the parachute. Preferably, each gore of the canopy is fitted with at least one slit located vertically in the middle of the gore adjacent the skirt or hem of the canopy. If each gore is fitted with multiple slits, the slits are preferably distributed evenly between the radials. As indicated, the slits preferably originate at the skirt or hem of the canopy and extend vertically upwardly toward the center of the canopy. As used herein, the "gore length" is the distance from the skirt or hem of the canopy to the apex or crown of the canopy.

If slits are incorporated into the canopy at the skirt or hem as described in accordance with the present invention, when the outer portion of the canopy is exposed to the airflow during deployment, the slits open up and the drag of the skirt of the canopy is reduced, thus limiting the potential for hem migration. Moreover, the airflow passing through the open slits pushes the opposite side of the canopy away from the migrating hem. In other words, the slits are positioned in a manner to allow airflow through the slit openings in order for the pressure on the outside of the canopy to be transferred through the openings and released or transferred to the inside of the lower section of the canopy.

Accordingly, it is an object of the present invention to provide a canopy configuration for parachutes which have a generally circular skirt or hem, such as semi-hemispherical, extended gore or any variant of axisymmetric parachutes and cruciform parachutes with arms attached, which minimizes the occurrence of canopy inversion.

It is another object of the present invention to provide a parachute in accordance with the preceding object in which a plurality of vertical slits are equally spaced around the canopy skirt or hem and extend upwardly therefrom, which slits can open to airflow from outside the canopy to inside the canopy, during parachute deployment.

It is a further object of the present invention to provide a parachute with a generally circular or round skirt or hem with at least one vertical slit for each gore of the parachute and which has a length or height of between about five percent (5%) and about fifteen percent (15%) of the gore length.

It is still another object of the present invention to provide a parachute with a generally circular skirt or hem in accordance with the preceding objects in which the slits are positioned in a manner to allow airflow through the slit openings during deployment in order for the air pressure on the outside of the canopy to be transferred through the openings and released or transferred to the lower inside of the canopy.

Another object of the present invention is to utilize elongated narrow vertical openings instead of slits that are equally spaced around the canopy skirt or hem and extend upwardly therefrom to provide the requisite airflow into the canopy during deployment of the canopy.

Yet another object of the present invention is to provide a plurality of slits or narrow openings around the skirt or hem of the canopy which are positioned in a manner to allow the requisite airflow through the slits or openings during deployment in order to reduce drag of the skirt of the canopy and in order for the air pressure on the outside of the canopy to be transferred through the openings and released or transferred to the lower inside of the canopy.

It is still a further object of the present invention to provide a parachute with anti-inversion capability that can be easily manufactured at a reasonable cost and without increasing the bulk of the parachute.

It is still a further object of the present invention to provide a cost effective solution to install an anti-inversion capability on parachutes that have a generally circular skirt or hem, such as semi-hemispherical, extended gore or any variant of axisymmetric parachutes and cruciform parachutes with arms attached.

Yet still another object of the present invention is to provide a method to prevent canopy inversion of a parachute having a canopy with a generally circular skirt or hem around a lower edge thereof by providing a plurality of generally vertical reinforced slits or elongated narrow openings spaced around the canopy adjacent the skirt or hem, so that the slits or openings reduce drag of the skirt of the canopy during deployment and permit air flow during deployment for air pressure on and outside the canopy to be transferred through the slits or openings and released to the lower inside of the canopy.

The above together with other objects and advantages of the present invention which will become subsequently apparent reside in the details of construction and operation as more fully hereinafter disclosed and claimed, reference being had to the accompanying drawings forming a part hereof, wherein like numerals refer like parts throughout.

DETAILED DESCRIPTION OF THE PREFERRED EMBODIMENTS

Although multiple preferred embodiments of the invention are explained in detail, it is to be understood that the embodiments are provided for illustration only. It is not intended that the invention be limited in scope to the details of structure or arrangement of components set forth in the present description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
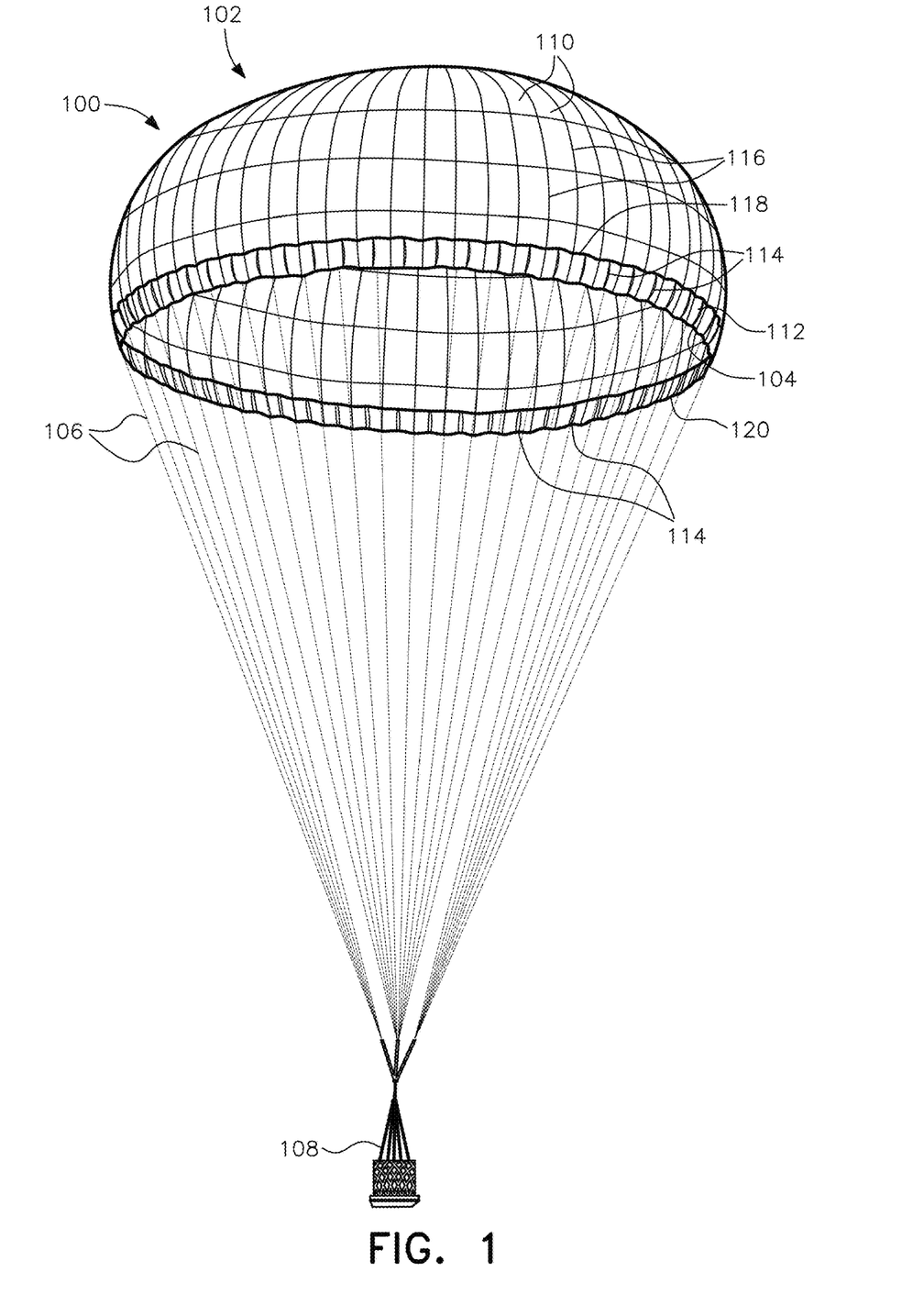
FIG. 1 is a side elevational view of a semi-hemispherical parachute and cargo load having a series of equally spaced vertical slits around the skirt or hem of the parachute, in accordance with the present invention.

A semi-hemispherical parachute, generally designated by reference numeral 100, is shown in FIG. 1. The parachute 100 includes a canopy, general designated by reference numeral 102, with a generally circular skirt or hem 104, to which is attached a series of suspension lines 106 leading to a cargo load 108. The canopy 102 includes a series of gores 110 separated by radials 116. A circular anti-inversion band 112 is formed around the entire skirt or hem 104 at the outer edge of each gore 110 by an installed upper lateral tape 118 and an existing skirt band 120. Positioned within the anti-inversion band 112 are a series of vertical slits 114.

Preferably, there is at least one slit 114 for each gore 110 and positioned midway of the radials 116. As shown, the slits 114 are slightly open, best to allow airflow therethrough. During deployment, the slits 114 can open and the drag of the skirt of the canopy is reduced, thus limiting the potential for hem migration and potential inversion. The slits 114 are positioned so that their openings allow airflow therethrough and air pressure on the outside of the canopy can be transferred through the slit openings and released or transferred to the lower inside of the canopy. It will be readily understood by those skilled in the art that after deployment and during normal descent, the airflow through the slits is reversed and the air pressure inside the canopy forces air outwardly through the slit openings.

Figure 2:
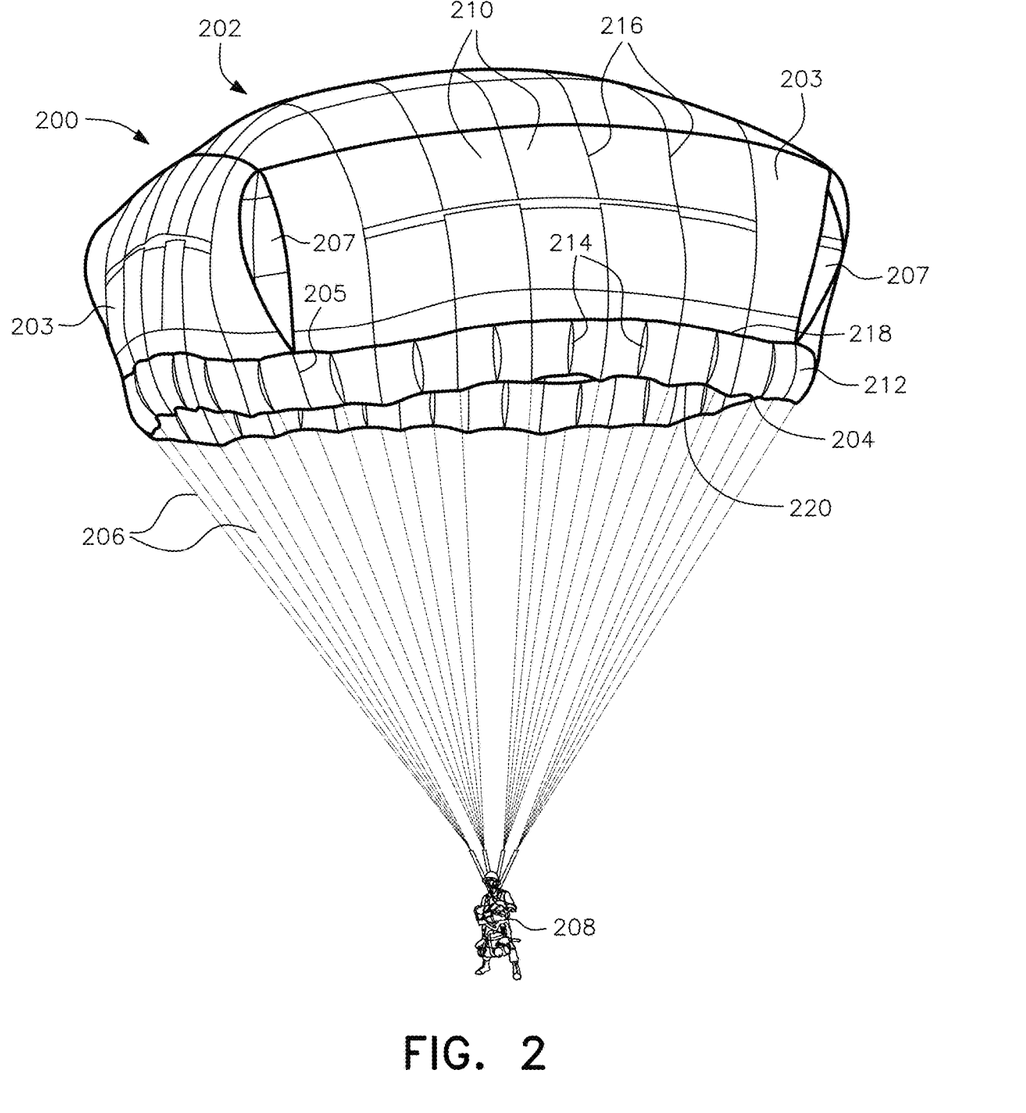
FIG. 2 is a side elevational view of a personnel cruciform parachute with four arms attached and having a series of equally spaced vertical slits around the skirt or hem of the parachute, in accordance with the present invention.

Turning now to FIG. 2, a cruciform parachute with arms attached, in accordance with U.S. Pat. No. 6,443,396, is shown and generally designated by reference numeral 200. Cruciform parachute 200 includes a canopy, generally designated by reference numeral 202, with a generally circular skirt or hem 204, to which suspension lines 206 are attached that, in turn, support an individual jumper 208.

Canopy 202 includes four arms 203 connected at their lower ends at 205 to form corner air openings 207. As shown, each arm 203 includes seven gores 210 separated by radials 216, but more or less gores 210 may be present depending upon the size of the canopy 202. A circular anti-inversion band 212 is formed around the entire skirt or hem 204 at the outer edge of each gore 210 by an installed upper lateral tape 218 and existing skirt tape or band 220 at the outer ends of each arm 203. Positioned within the band 212 are a series of vertical slits 214.

As with the FIG. 1 embodiment, there is preferably at least one slit 214 for each gore 210 and positioned midway of the radials 216, but more or less slits 214 can be utilized depending upon design criteria, and the slits are preferably equally spaced around the skirt or hem 204. The slits 214 are shown as slightly open, thus to allow airflow therethrough. During deployment, the slits 214 can open and the drag of the skirt of the canopy is reduced, thus limiting the potential for hem migration and potential inversion. Again, the slits 214 are positioned so that their openings allow airflow, and air pressure on the outside of the canopy during deployment can be released or transferred through the slit openings to the lower inside of the canopy.

Figure 3:
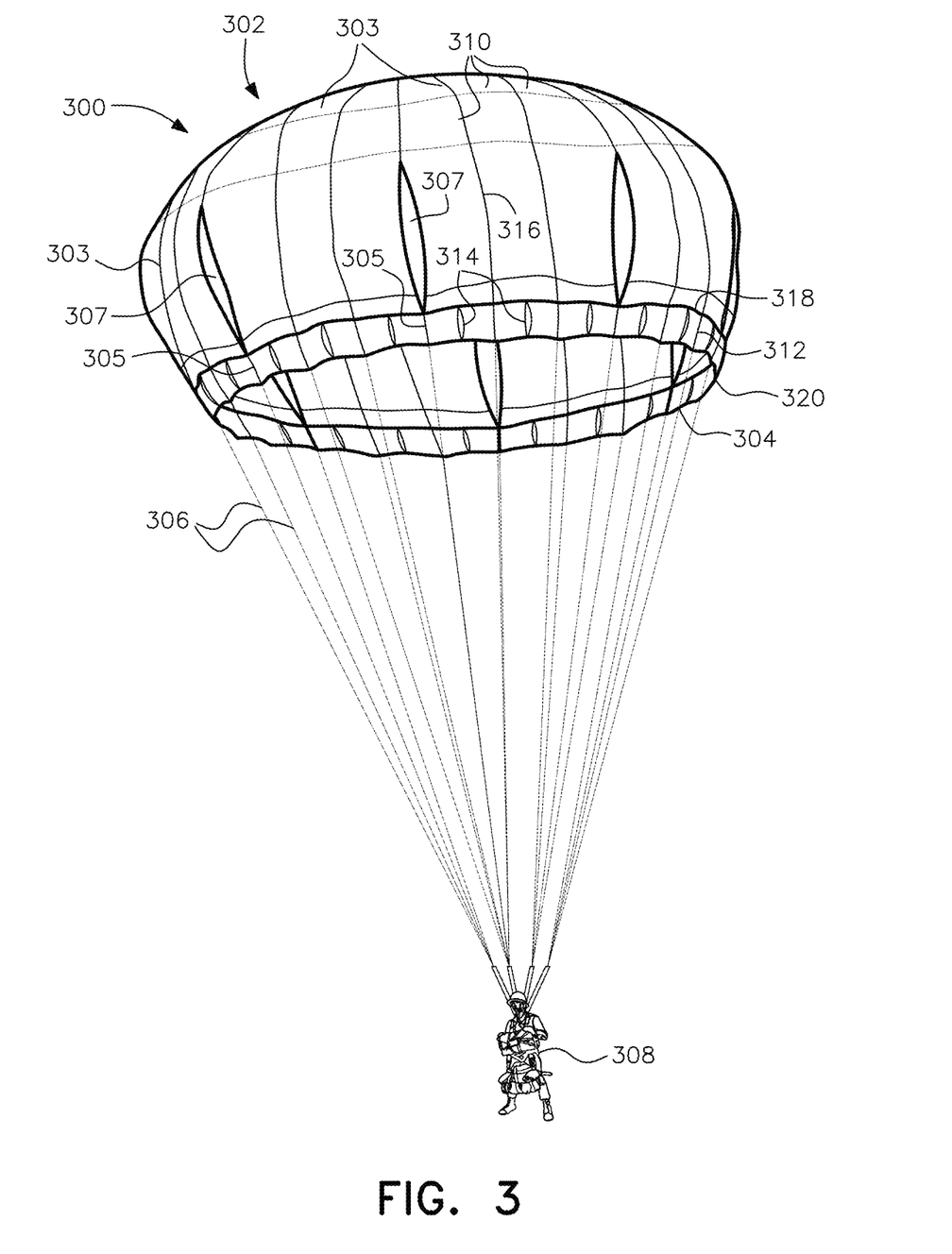
FIG. 3 is a side elevational view of another personnel cruciform parachute with eight arms attached and having a series of equally spaced vertical slits around the skirt or hem of the parachute, in accordance with the present invention.

Turning now to FIG. 3, another cruciform parachute configuration is shown and generally designated by reference numeral 300. Cruciform parachute 300 includes a canopy, generally designated by reference numeral 302, with a generally circular skirt or hem 304, to which suspension lines 306 are attached that, in turn, support an individual jumper 308.

Canopy 302 includes eight arms connected at the lower ends 305 to form eight openings 307. As shown, each arm 303 includes three gores 310 separate by radials 316, but more or less gores 310 may be present depending upon the size of the canopy 302. A circular anti-inversion band 312 is formed around the entire skirt or hem 304 at the outer edge of the gores 310 by an installed upper lateral tape 318 and existing skirt tape or band 320 at the outer ends of each arm 303. Positioned within the band 312 are a series of vertical slits 314.

As with the FIG. 1 and FIG. 2 embodiments, there is preferably at least one slit 314 for each gore 310, and the slits are preferably positioned midway of the radials 316, but more or less slits 314 can be utilized depending upon design criteria, and preferably equally spaced around the skirt 304. The slits 314 are shown as slightly open, thus to allow air flow therethrough. During deployment, the slits 314 can open and the drag of the skirt of the canopy is reduced, thus limiting the potential for hem migration and potential inversion. Again, the slits 314 are positioned so that their openings allow airflow, and air pressure on the outside of the canopy during deployment can be released and transferred through the slit openings to the lower inside of the canopy.

Figure 4:
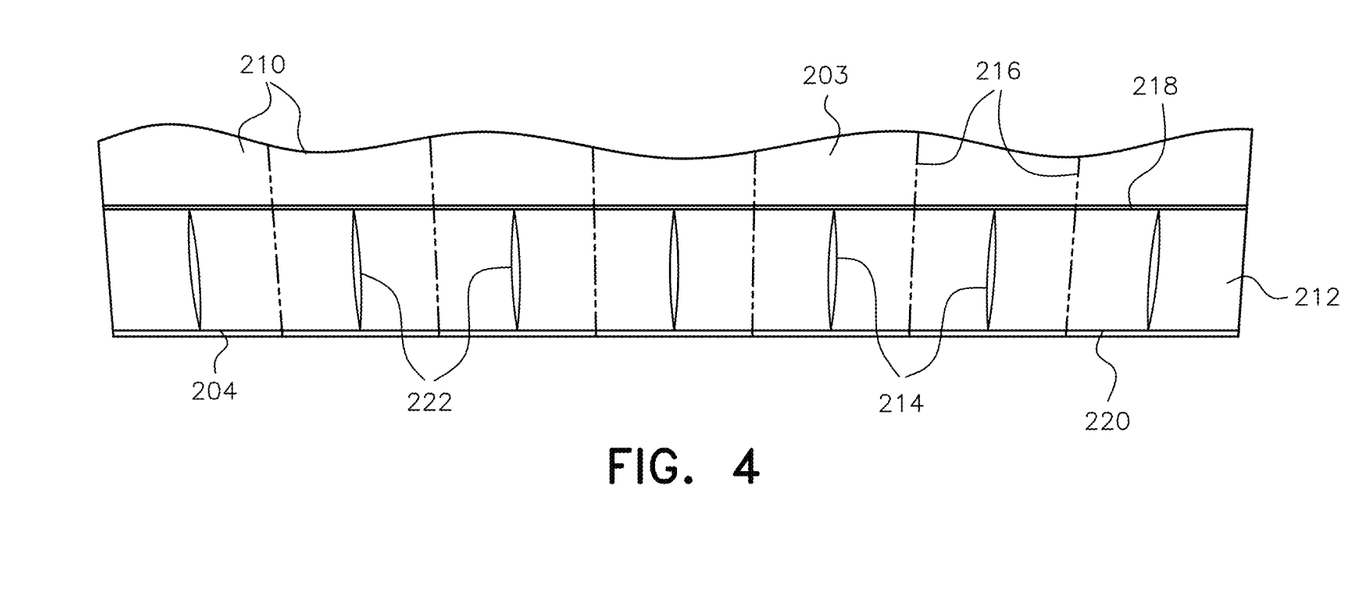
FIG. 4 is an enlarged side view of a representative embodiment of one arm of the cruciform parachute of FIG. 2 showing vertical slits formed into the skirt in the center of each gore, in accordance with the present invention.

Turning now to FIG. 4, there is shown an enlarged view of the lower portion of one arm 203 of cruciform parachute 200. As shown, a one-half inch upper lateral tape 218 is sewn across arm 203 approximately 30 inches up from the bottom of skirt or hem 204 and closing the bottom of corner air openings 207. A single one-half inch tape 222 is sewn into the center of each gore 210 from the upper lateral tape 218 down to the skirt band or tape 220 at the bottom of the skirt or hem 204 at the outer end of arms 203. Slits 214 are formed in the middle of tapes 222 leaving the lateral tape 218 and the skirt band 220 intact. The slits 214 are shown in an open condition to allow airflow passing therethrough. The slits 214 are positioned so that their openings during deployment allow airflow and air pressure on the outside of the canopy to be transferred through the openings and released to the lower inside of the canopy 202.

In some circumstances, it may be desirable for each gore 110, 210 and 310 to have more than one slit 114, 214 and 314, respectively. In such event, the slits are preferably distributed evenly between the radials 116, 216 and 316, respectively. On the other hand, it may be desirable in certain parachute configurations for the plurality of slits around the skirt to be less than the number of gores. In such circumstances, the slits should preferably be evenly distributed around the generally circular skirt or hem, and it is believed that their number should be no less than fifty percent (50%) of the number of gores. In some parachute constructions, such as cruciform parachutes, it may be desirable to concentrate the vertical slits in the areas most vulnerable to inversion during deployment, such as in the areas where the arms are attached with fewer slits in the areas midway in the arms.

Figure 5:
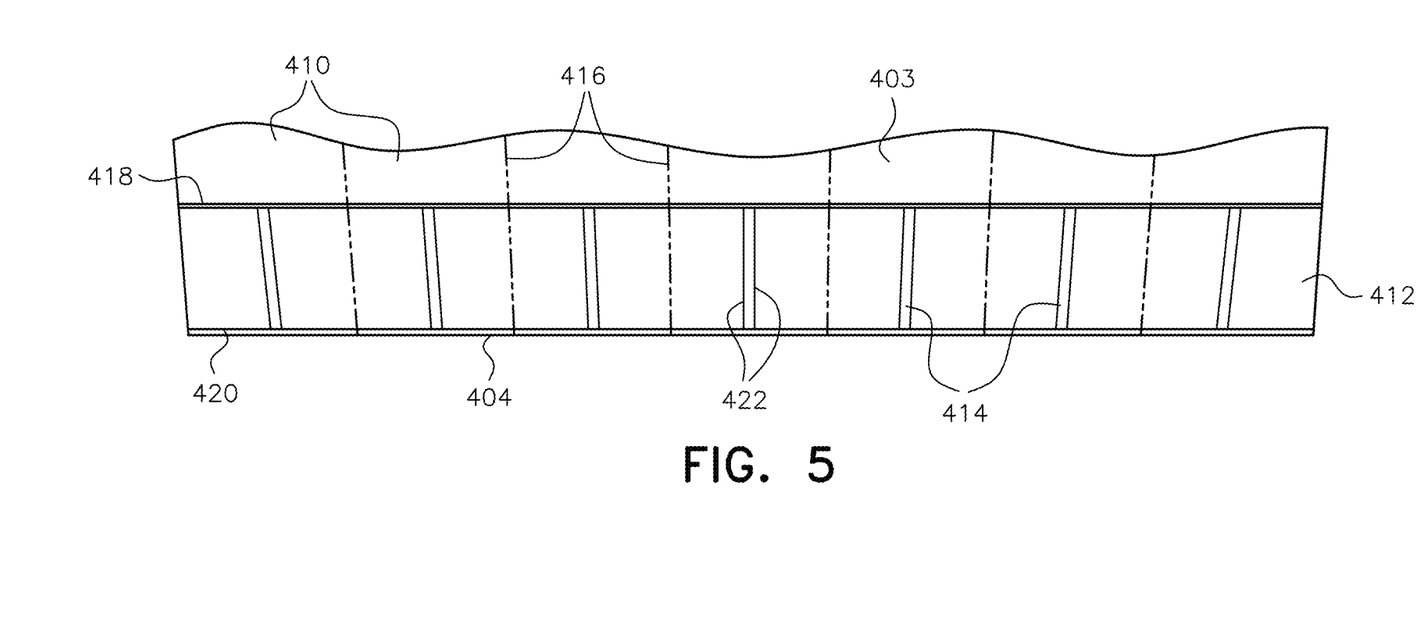
FIG. 5 is an enlarged side view of a representative embodiment of one arm of the cruciform parachute of FIG. 2, similar to FIG. 4, except showing elongated narrow vertical rectangular openings instead of vertical slits formed into the skirt in the center of each gore, in accordance with the present invention.
Figure 6:
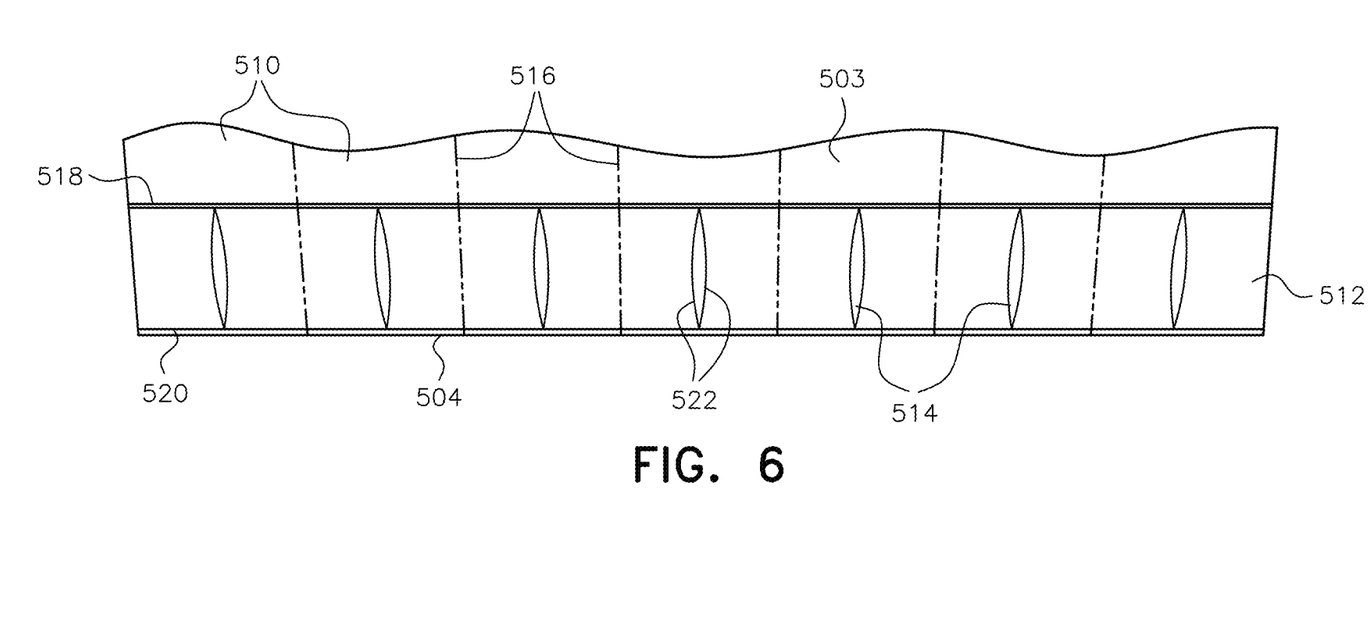
FIG. 6 is an enlarged side view of a representative embodiment of one arm of the cruciform parachute of FIG. 2, similar to FIG. 4, except showing elongated narrow vertical oval openings instead of vertical slits formed into the skirt in the center of each gore, in accordance with the present invention.

While vertical slits as shown in FIGS. 1-4 are clearly preferred, it is possible that elongated narrow openings could be utilized instead of slits, as shown in FIGS. 5 and 6. In the FIG. 5 embodiment, narrow rectangular openings 414 are utilized as part of the circular anti-inversion band 412. In the FIG. 6 embodiment, elongated oval openings 514 are utilized as part of the circular anti-inversion band 512.

As shown in FIG. 5, the outer end of the arm 403 includes seven gores 410 divided by radials 416. Upper reinforcing tape 418 which extends across the entire arm 403 and the skirt band or tape 420 at the bottom of the skirt or hem 404 at the outer end of arm 403 define the circular anti-inversion band 412. Instead of slits, the FIG. 5 embodiment utilizes elongated narrow rectangular openings 414 reinforced along their side edges by reinforcing tapes 422.

As shown in FIG. 6, the outer end of the arm 503 includes seven gores 510 divided by radials 516. Upper reinforcing tape 518 which extends across the entire arm 503 and the skirt band or tape 520 at the bottom of the skirt or hem 504 at the outer end of the arm 503 define the circular anti-inversion band 512. Instead of slits, the FIG. 6 embodiment utilizes elongated narrow oval openings 514 reinforced along their side edges by reinforcing tapes 522.

In the event elongated narrow openings are utilized instead of slits as illustrated and described with respect to FIGS. 5 and 6, the total area of the openings around the circular anti-inversion band 414 or 514 should be no more than 2.5% of the total area of the circular anti-inversion band.

Further, while the slits 114, 214 and 314 are preferably vertical according to the present invention, it is believed that the slits may not need to be perfectly vertical, and may even be horizontal, so long as the slit openings are sufficient to allow the requisite airflow during deployment into the canopy in order to overcome canopy inversion.

Figure 7:
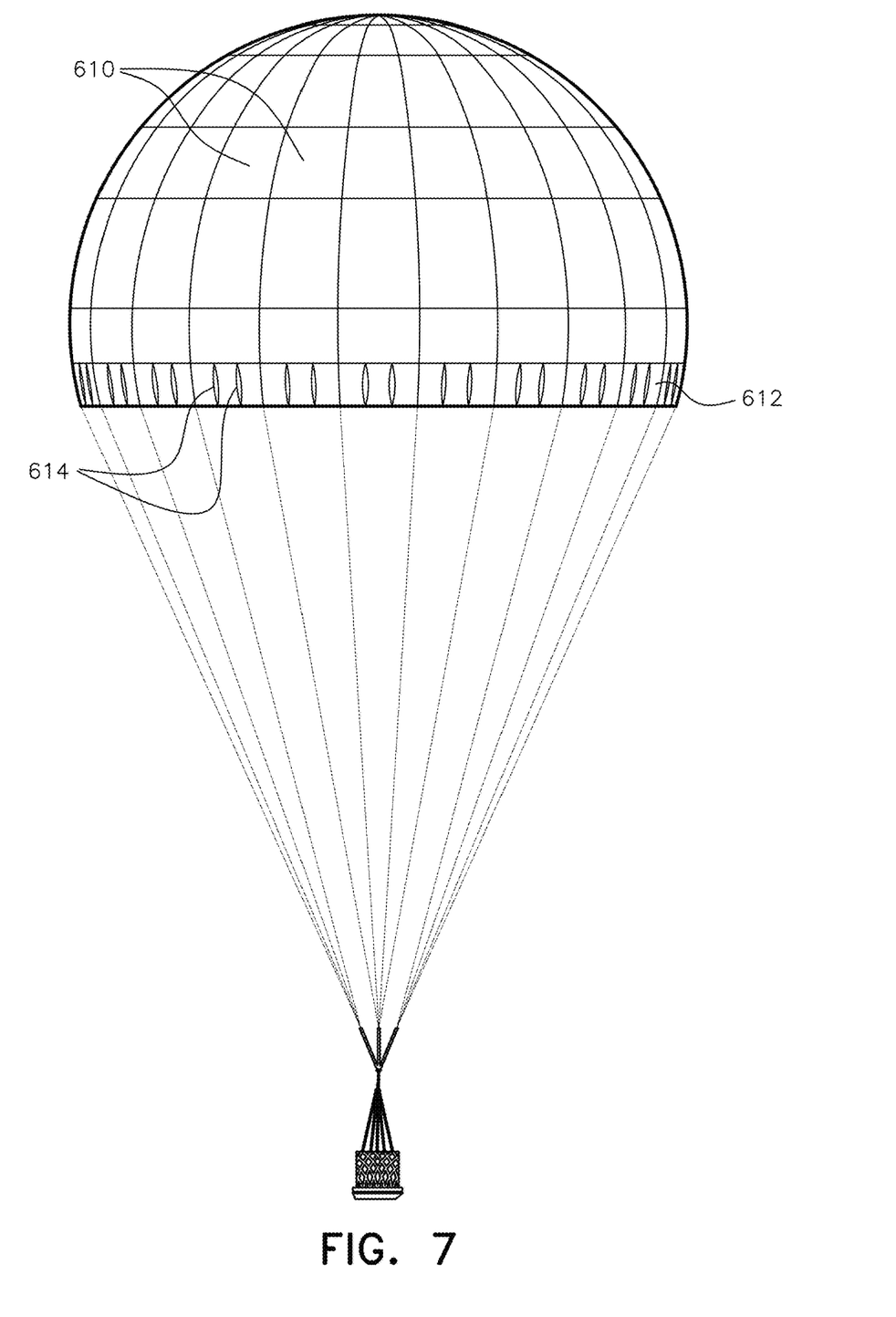
FIG. 7 is a side elevational view of a semi-hemispherical parachute and cargo load, similar to FIG. 1, having a pair of equally spaced vertical slits for each gore around the skirt or hem of the parachute, in accordance with the present invention.
Figure 8:
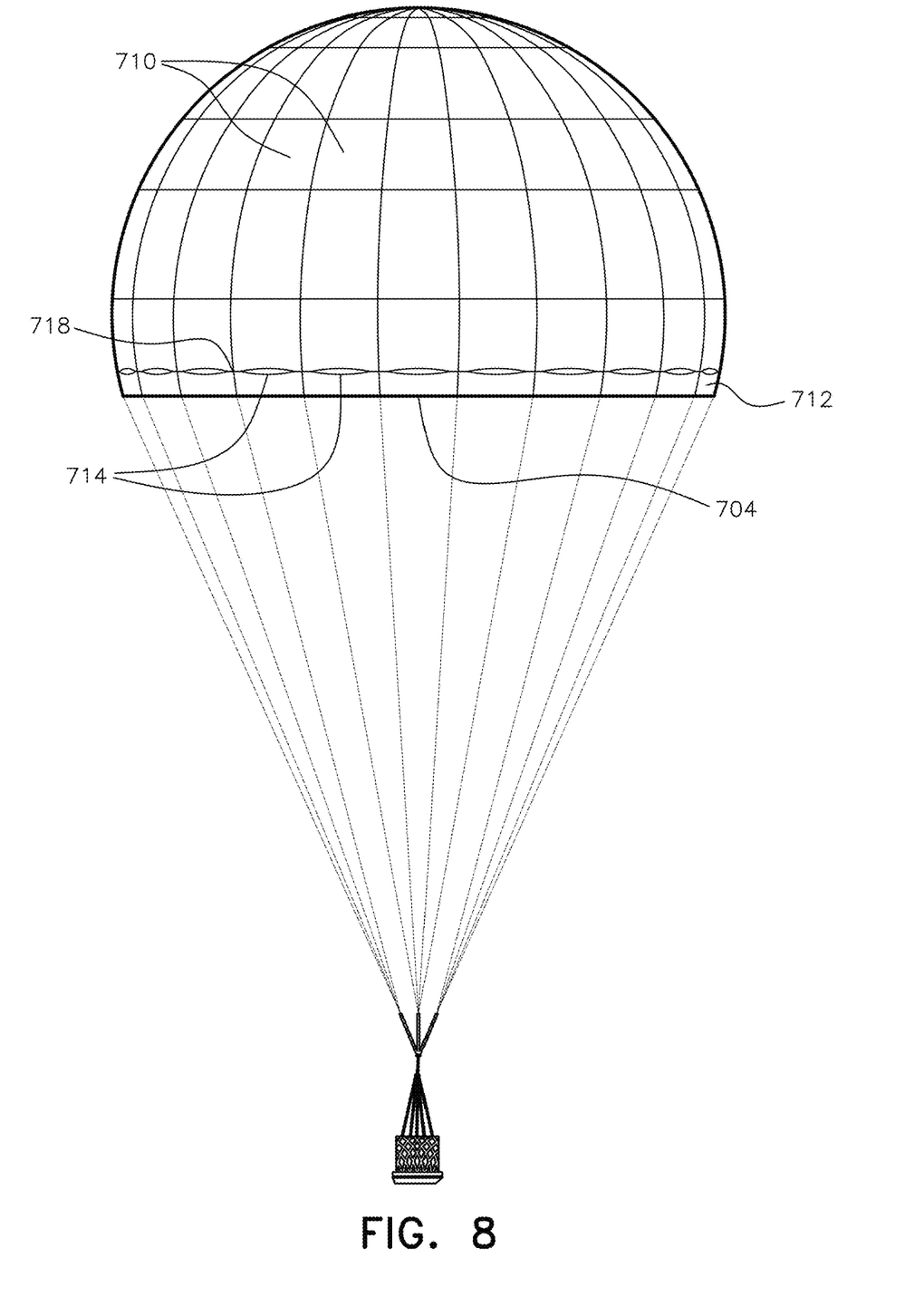
FIG. 8 is side elevational view of a semi-hemispherical parachute and cargo load, similar FIG. 1, having a series of horizontal slits, one for each gore, around the skirt or hem of the parachute, in accordance with the present invention.
Figure 9:
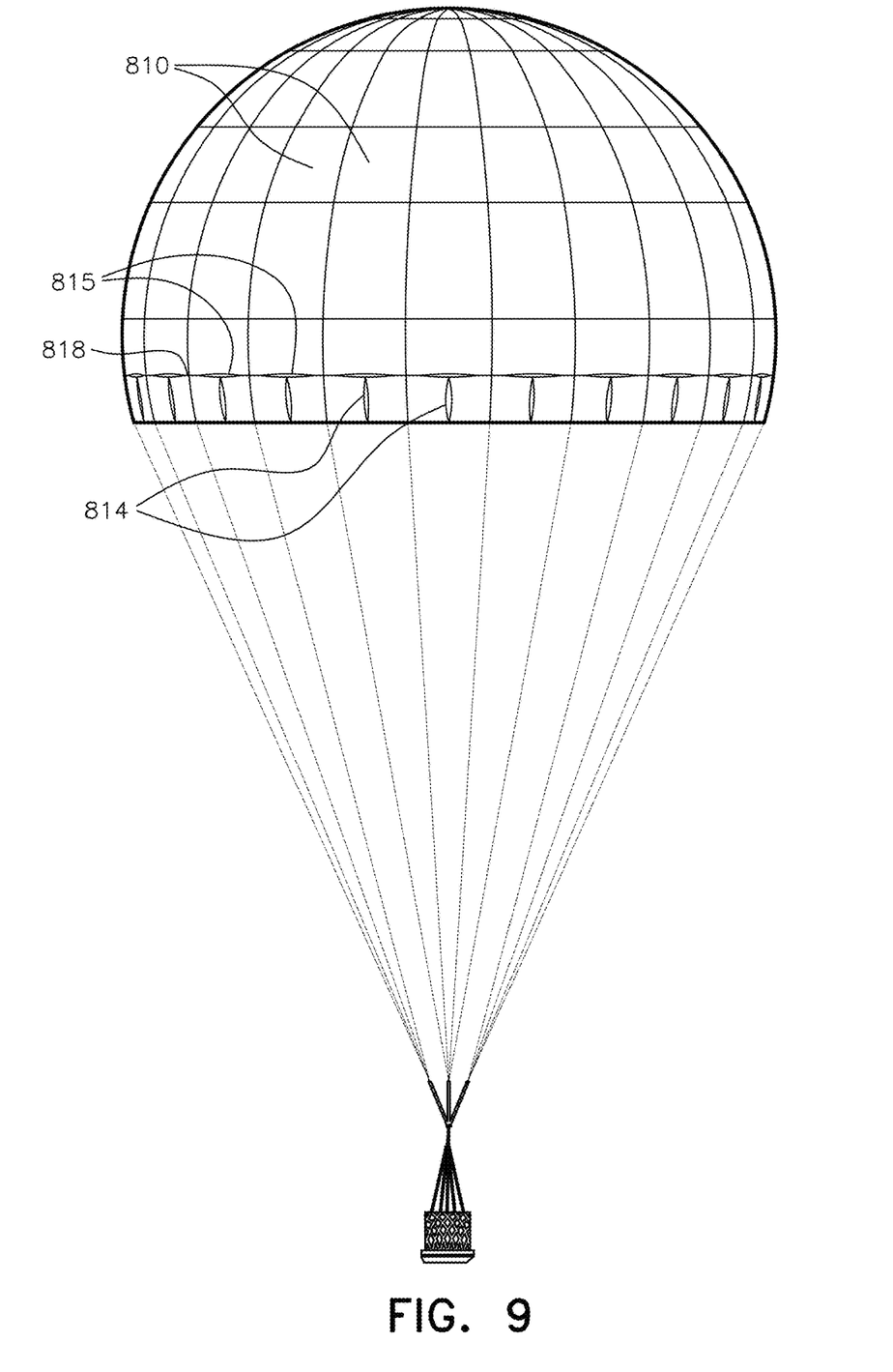
FIG. 9 is a side elevational view of a semi-hemispherical parachute and cargo load, similar to FIG. 1, having a series of horizontal and vertical slits for each gore spaced around the skirt or hem of the parachute, in accordance with the present invention.

Alternatives to vertical slits or elongated narrow openings shown and described with respect to FIGS. 1-6 are shown in FIGS. 7, 8 and 9. FIG. 7 shows a pair of reinforced vertical slits 614 for each gore 610 equally spaced around the canopy and the circular anti-inversion band 612.

Instead of vertical slits, FIG. 8 shows horizontal slits 714, one for each gore 710, positioned along the upper reinforcing lateral tape 718 of the circular anti-inversion band 712 at the bottom of the skirt or hem 704 at the outer end of the gores 710.

Finally. FIG. 9 shows both vertical slits 814 located in the circular anti-inversion band 812 midway between radials 816, similar to that shown in FIG. 1, and horizontal slits 815 above in the upper reinforcing lateral tape 818 for each gore 810.

A method for making a semi-hemispheric parachute canopy in accordance with the present invention, such as shown in FIG. 1, is as follows. The upper portion of the canopy 102 is assembled to the prerequisite size without the circular anti-inversion band 112. The circular anti-inversion band 112 is then assembled separately utilizing panel sections having the requisite size and reinforcing tapes along their side edges. The sections are then laid side-by-side to define the requisite slit 114 therebetween and assembled in line with the requisite skirt band 120. Once assembled, the circular anti-inversion band 112 is aligned with the respective gores of the upper canopy, and attached with the upper reinforcing tape 118. The suspension lines 106 can then be attached to the existing skirt band 120 in the customary manner.

One method for making a cruciform parachute in accordance with the present invention, such as the cruciform parachute shown in FIG. 2, is as follows. The canopy 202 is full size and the four arms 203 connected at their lower ends 205 and the existing skirt tape or band 220 at the outer ends of each arm 203 is installed. A one-half inch reinforcing tape 218 is sewn across each arm approximately 30 inches up from the skirt or hem 204 to thus form the bottom of the corner air openings 207. A single one-half inch tape is then sewn vertically along the center at the bottom of each gore 210 between the upper reinforcing tape 218 and the existing skirt tape or band 220. A hot knife is then used to cut a slit down the middle of the vertical tapes leaving the upper lateral tape 218 and existing skirt tape or band 220 intact, to thus form the slits 214 of the circular anti-inversion band 212.

EXAMPLES

Hereinafter are provided specific examples of parachute configurations which could be made in accordance with the present invention.

Example 1

A semi-hemispherical parachute, such as, shown in FIG. 1, has a circumference at the existing skirt band 120 of approximately 128 feet. The gore length from the skirt band 120 to the center of the canopy opening at the top of the canopy is approximately 384 inches, which includes the 26 inch radius of the circular opening at the top of the canopy. The slits 114 have a length of about 22 inches, which represents a height of approximately 5.73% of the gore length.

Example 2

A cruciform parachute in accordance with FIG. 2 could have a circumference around the skirt band or hem 220 of 75 feet (or 900 inches). The gore length of each arm from the canopy crown to the skirt or hem 204 is approximately 282 inches which includes the height of the circular anti-inversion band 212. The length of the slits 214 is 30 inches; thus, the height of the slits is approximately 10.64% of the gore length.

Example 3

An example of the parachute shown in FIG. 3 could have a gore length from the canopy crown to the skirt band 304 of approximately 300 inches. Due to the design, the slits have two different heights of 19 inches and 22 inches; thus the slit height to gore length is approximately 6.33% and 7.33%, respectively.

For the purposes of this specification, including the appended claims, the terms "about" and "approximately" when modifying numbers expressing a number of sizes, dimensions, portions, shapes, formulations, parameters, percentages, quantities, characteristics and other numerical values used in the specification and claims, the term is meant to encompass the stated value plus or minus 5%.

The above examples are exemplary only of the many variants of parachutes which can be made according to the present invention as disclosed herein.

The foregoing is considered as illustrative of the principles of the invention. Further, modifications and changes will readily occur to those skilled in the art. As such, it is not desired to limit the invention to the exact construction and operation shown and described; all suitable modifications and equivalents may be resorted to falling within the scope of the invention.

What is claimed is:

1. A parachute comprising:
   a canopy including multiple gores having a gore length and a generally circular skirt or hem around a lower edge of said canopy, said skirt or hem having a skirt band;
   suspension lines attached to said skirt band and configured to support a load;
   a plurality of generally vertical reinforced slits spaced around said canopy and extending upwardly from said skirt band to a vertical slit top end; and
   a corresponding plurality of generally horizontal reinforced slits positioned at each said vertical slit top end.

2. The parachute in accordance with claim 1, wherein the parachute is a semi-hemispherical, extended gore or any variant of axisymmetric parachute.

3. The parachute in accordance with claim 1, wherein the parachute is a cruciform parachute with arms attached forming corner air openings.

4. The parachute in accordance with claim 1, wherein said vertical slits are positioned mid-center of each gore and each of said horizontal slits is positioned adjacent a lower edge of each gore, preferably 5% to 10% of the gore length from the lower edge of the gore, and having a mid-point at said vertical slit top end.

5. The parachute in accordance with claim 1, wherein said generally vertical slits and said generally horizontal slits allow airflow through openings formed by said generally vertical slits and said generally horizontal slits during deployment in order for air pressure on an outside of the canopy to be transferred through the openings and released to a lower inside of the canopy.

6. The parachute in accordance with claim 1, wherein said generally vertical slits and said generally horizontal slits are equally spaced around a continuous anti-inversion band extending around a lower portion of said gores with a bottom of said continuous anti-inversion band defined by a reinforcement of said skirt or hem with said continuous anti-inversion band and an upper edge of said continuous anti-inversion band defined by a reinforcement extending around said multiple gores, said generally horizontal slits being formed in said upper edge continuous anti-inversion band reinforcement.

7. A parachute comprising:
   a canopy including multiple gores in a generally circular skirt or hem around a lower edge thereof, said skirt or hem having a skirt band;

suspension lines attached to said skirt band and configured to support a load;

a plurality of generally vertical reinforced slits or elongated narrow openings spaced around said canopy and extending upwardly from an area adjacent said skirt band to a vertical slit or narrow opening top end; and a corresponding plurality of generally horizontal reinforced slits or elongated narrow openings positioned at each said vertical slit or narrow opening top end, said generally vertical slits or elongated narrow openings and said generally horizontal slits or elongated narrow openings being configured to enable airflow therethrough so as to prevent canopy inversion during deployment.

8. The parachute in accordance with claim 7, wherein said generally vertical slits or elongated narrow openings are contained within a continuous anti-inversion band extending around a lower portion of said gores with a bottom of said continuous anti-inversion band defined by a reinforcement of said skirt or hem, and an upper edge of said continuous anti-inversion band defined by a reinforcement extending around said multiple gores, said generally horizontal slits or elongated narrow openings formed in said continuous anti-inversion band upper edge reinforcement.

9. The parachute in accordance with claim 8, wherein a total area of the generally vertical slits or narrow openings and the generally horizontal slits or elongated narrow openings constitutes no more than 2.5% of a total area of the circular anti-inversion band.

10. The parachute in accordance with claim 7, wherein the parachute is a semi-hemispherical, extended gore or any variant of axisymmetric parachute.

11. The parachute in accordance with claim 7, wherein the parachute is a cruciform parachute with arms attached forming corner air openings.

12. The parachute in accordance with claim 7, wherein said generally vertical slits or elongated narrow openings and said generally horizontal slits or elongated narrow openings are spaced equally around said canopy.

13. The parachute in accordance with claim 7, wherein a number of said generally vertical slits or elongated narrow openings and said generally horizontal slits or elongated narrow openings is no less than fifty percent (50%) of a number of said gores.

14. The parachute in accordance with claim 7, wherein opening of said generally vertical slits or elongated narrow openings and said generally horizontal slits or elongated narrow openings during deployment reduces drag of the skirt or hem of the canopy, thus limiting potential for skirt or hem migration.

15. The parachute in accordance with claim 7, wherein air flow through said generally vertical slits or elongated narrow openings and said generally horizontal slits or elongated narrow openings transfers air pressure on an outside the canopy through said slits or openings to a lower inside of the canopy during deployment.

16. The parachute in accordance with claim 7, wherein each of the generally vertical slits or elongated narrow openings and the corresponding generally horizontal slits or elongated narrow openings has a T-shaped configuration.

17. A method of providing anti-inversion capability to a parachute having a canopy with a generally circular skirt or hem around a lower edge thereof, the skirt or hem having a skirt band, said method comprising providing a plurality of generally vertical reinforced single slits or elongated narrow openings spaced around the lower edge of said canopy, and extending upwardly from said skirt band, said slits or openings being configured to enable air flow during deployment such that air pressure on an outside of the canopy is transferred through the slits or openings and released to a lower inside of the canopy so as to prevent canopy inversion during the deployment.

18. The method in accordance with claim 17, wherein the parachute is selected from the group consisting of semi-hemispherical, extended gore and any variant of axisymmetric parachutes and cruciform parachutes with arms attached to form corner openings.

19. The method in accordance with claim 17, wherein said slits or openings are also configured to reduces drag of the skirt or hem of the canopy during deployment.

20. The method in accordance with claim 17, wherein said generally vertical reinforced slits or elongated narrow openings extend upwardly to a vertical slit or narrow opening top end, and a corresponding plurality of generally horizontal reinforced slits or elongated narrow openings are positioned at said vertical slit or narrow opening top end.

21. The method in accordance with claim 20, wherein said generally vertical slits or elongated narrow openings are contained within a continuous anti-inversion band around a lower portion of said gores with a bottom of said continuous anti-inversion band defined by a reinforcement of said skirt or hem and an upper edge of said continuous anti-inversion band defined by a reinforcement extending around said multiple gores, said generally horizontal slits or elongated narrow openings formed in said continuous anti-inversion band upper edge reinforcement.

22. The method in accordance with claim 17, wherein a bottom end of each of the single slits or elongated narrow openings is located adjacent to the skirt band.

23. The method in accordance with claim 17, wherein one of the plurality of generally vertical reinforced single slits or elongated narrow openings spaced around said canopy and extending upwardly from said skirt band is positioned midway between each radial of the canopy.

24. The method in accordance with claim 17, wherein one or more of the plurality of generally vertical reinforced single slits or elongated narrow openings spaced around said canopy and extending upwardly from said skirt band are positioned between each radial of the canopy.

25. The method in accordance with claim 17, wherein the plurality of generally vertical reinforced single slits or elongated narrow openings extend upwardly from the skirt, and have a vertical height of between about five percent (5%) and about fifteen percent (15%) of a gore length.

26. A method of providing anti-inversion capability to a parachute having a canopy with a generally circular skirt or hem around a lower portion thereof, the skirt or hem having a skirt band, said method comprising providing a plurality of generally vertical reinforced slits spaced around said canopy and extending upwardly from said skirt band to a vertical slit top end, and a corresponding plurality of generally horizontal reinforced slits positioned at each vertical slit top end, said generally vertical slits and said generally horizontal slits enabling air flow therethrough during deployment such that air pressure on an outside of the canopy in transferred through said generally vertical and said generally horizontal slits and released to a lower inside of the canopy so as to prevent canopy inversion during the deployment.

27. The method in accordance with claim 26, wherein the parachute is selected from the group consisting of semi-hemispherical, extended gore and any variant of axisymmetric parachutes and cruciform parachutes with arms attached to form corner openings.

* * * * *